United States Patent

[15] 3,690,261

Yokoi

[45] Sept. 12, 1972

[54] DEVICE FOR MAKING LISTS BY COPYING PORTIONS OF DOCUMENTS IN AN INTEGRATED FORM

[72] Inventor: Junichi Yokoi, 11-20, 2-chome, Wakehonmachi, Higashi-Osaka, Japan

[22] Filed: Oct. 6, 1969

[21] Appl. No.: 863,980

[30] Foreign Application Priority Data

Oct. 5, 1968 Japan ......................43/72696

[52] U.S. Cl. ..........40/104.04, 40/104.11, 40/104.12
[51] Int. Cl. ..............................................B42f 15/00
[58] Field of Search.40/102, 104.03, 104.04, 104.05, 40/104.06, 104.09, 104.13, 104.12, 104.11, 104.17; 355/39, 72, 75, 76; 312/185

[56] References Cited

UNITED STATES PATENTS 873,379   12/1907   Koch ..........................40/102

1,359,990   11/1920   Higdon ......................312/185

*Primary Examiner*—Robert W. Michell
*Assistant Examiner*—L. R. Oremland
*Attorney*—Tab T. Thein

[57] ABSTRACT

Device comprising replaceable holders for documents of which portions have to be copied in the form of an integrated list, an actuating frame, a base plate disposed under the frame, and links connecting the frame and the base plate. The document holders are mounted in recesses in both the frame and the base plate, with suitable spaces apart. When the frame is folded down and fixed onto the base plate, the documents inserted in the holders are brought into orderly arrangement, in an overlapping manner, each exposing a definite marginal index portion. Thus the original sheets or documents can be complied into a list which can then be subjected to a conventional copying operation.

10 Claims, 15 Drawing Figures

PATENTED SEP 12 1972 3,690,261

INVENTOR.
JUNICHI YOKOI

BY

AGENT

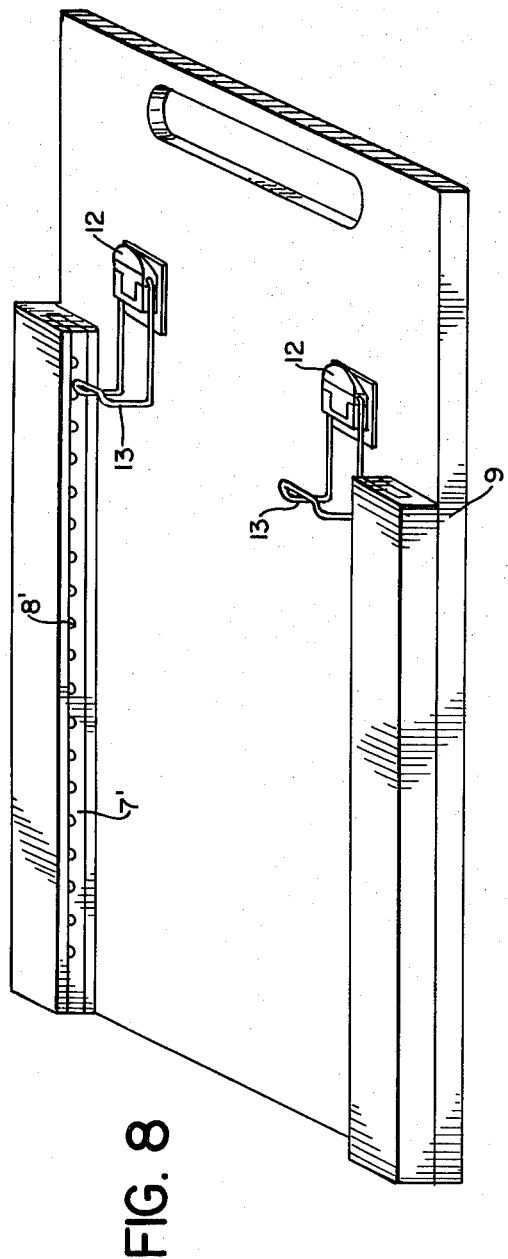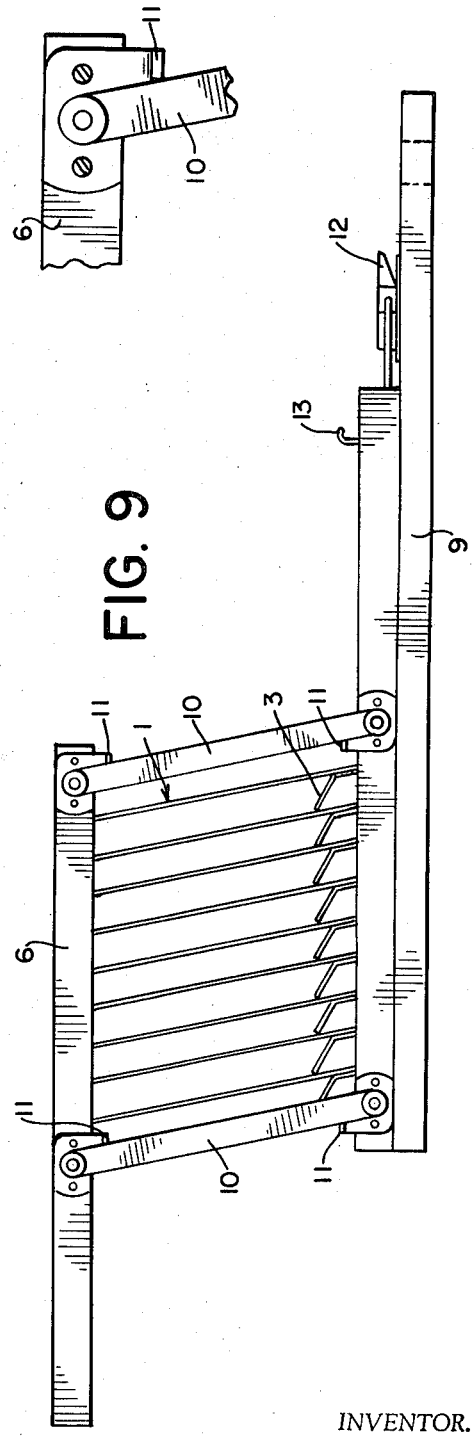

INVENTOR.
JUNICHI YOKOI

BY

AGENT

INVENTOR.
JUNICHI YOKOI

BY

AGENT

DEVICE FOR MAKING LISTS BY COPYING PORTIONS OF DOCUMENTS IN AN INTEGRATED FORM

The present invention relates to a device for making lists by copying portions of documents in an integrated form.

In case lists or specifications are to be made from various slips, that is, in making for instance daily trial balances, ledgers, debit notes in trading firms, or cargo particulars in shipping firms, or for example lists of voters in a constituency in government and public offices, numerous documents had so far to be transcribed by handwriting. However such a conventional method is disadvantageous in that it requires long time, and the lists obtained are not always free of errors.

An object of the present invention is to provide a device for making lists by copying portions of documents in an integrated form, by which lists can be made quickly, free of errors and in a simple operation.

The present invention will hereinafter be described with reference to the accompanying drawings, in which FIG. 1 is a perspective view of a document holder in the inventive device;

FIG. 8 is a perspective view of a base plate of the device;

FIG. 9 is a front view showing the assembled device of the invention;

FIG. 10 is a fragmentary front view on an enlarged scale showing a portion of FIG. 9;

Figure 1:
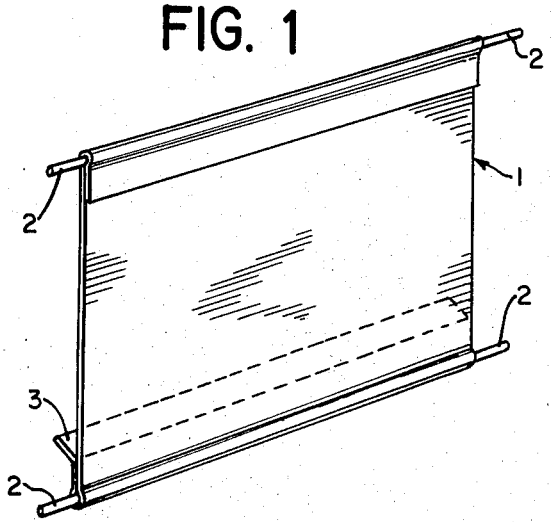
Figure 2:
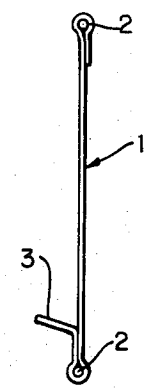
FIG. 2 is a side elevation of the document holder of FIG. 1.

Referring to FIGS. 1 and 2, there is shown a generally oblong document holder 1 for the inventive device, provided with axial or lengthwise wires 2 along its opposite upper and lower longer edges, the latter relative to a holder tongue 3, The tongue is formed by bending the lower edge portion of the sheet material of which the holder 1 is made, the tongue 3 thus being adapted to be opened or closed with respect to the holder 1. In order to ensure opening or closing, appropriate means, e.g., a spring (not shown), may be provided between the folded portions.

Figure 3:
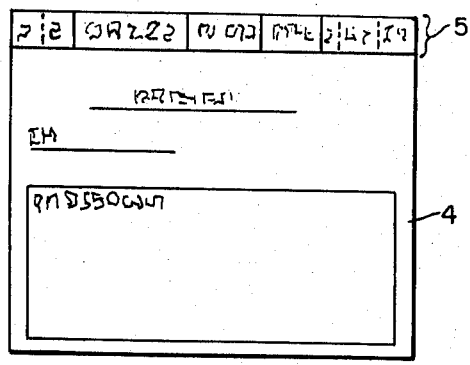
FIG. 3 is a plan view of an example of an original sheet or document to be copied by means of the inventive device.
Figure 4:
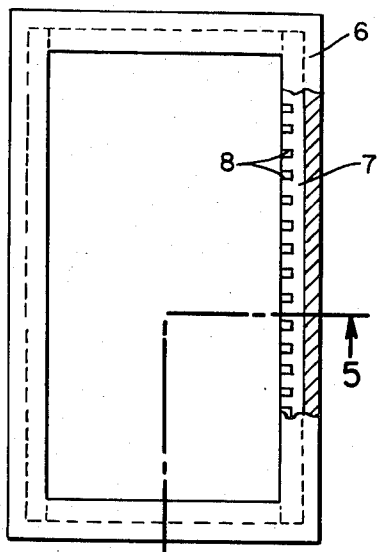
FIG. 4 is a plan view of an actuating frame for the device.
Figure 6:
FIG. 6 is a plan view of an axial wire supporter for the device.
Figure 5:
FIG. 5 is a front view of the frame, partly in section, along line 5 - 5 of FIG. 4.
Figure 7:
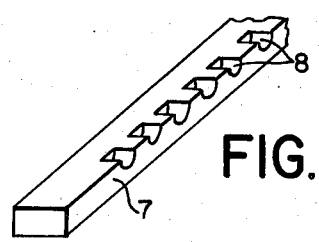
FIG. 7 is an enlarged perspective view showing part of the wire supporter of FIG. 6.
Figure 11:
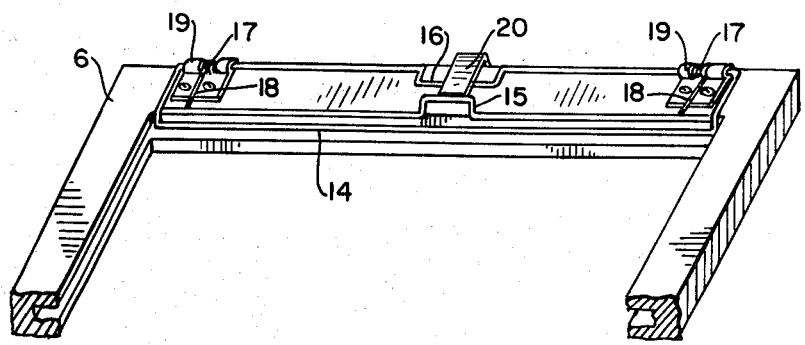
FIG. 11 is a partial perspective view showing the actuating frame of FIGS. 4 and 5.
Figure 12:
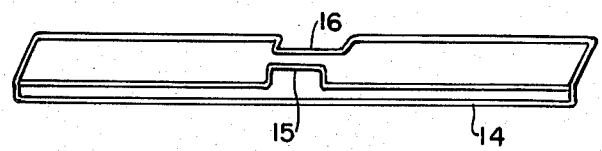
FIG. 12 is a perspective view showing a wire document clamp for the device.
Figure 13:
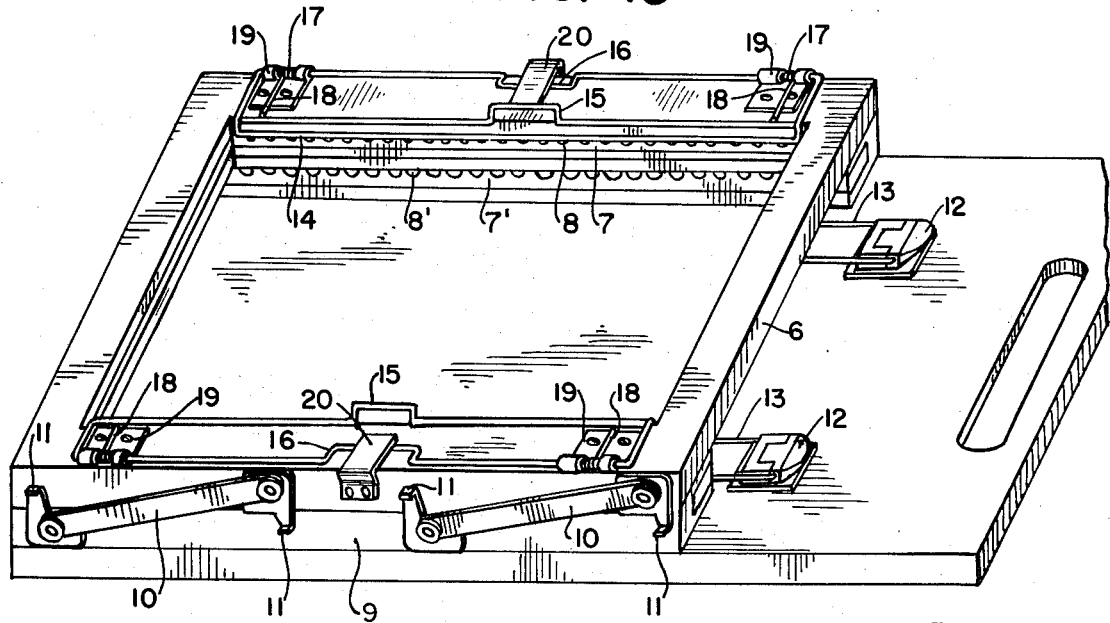
FIG. 13 is a perspective view showing certain parts of FIGS. 4, 6 and 8 as they are assembled.
Figure 14:
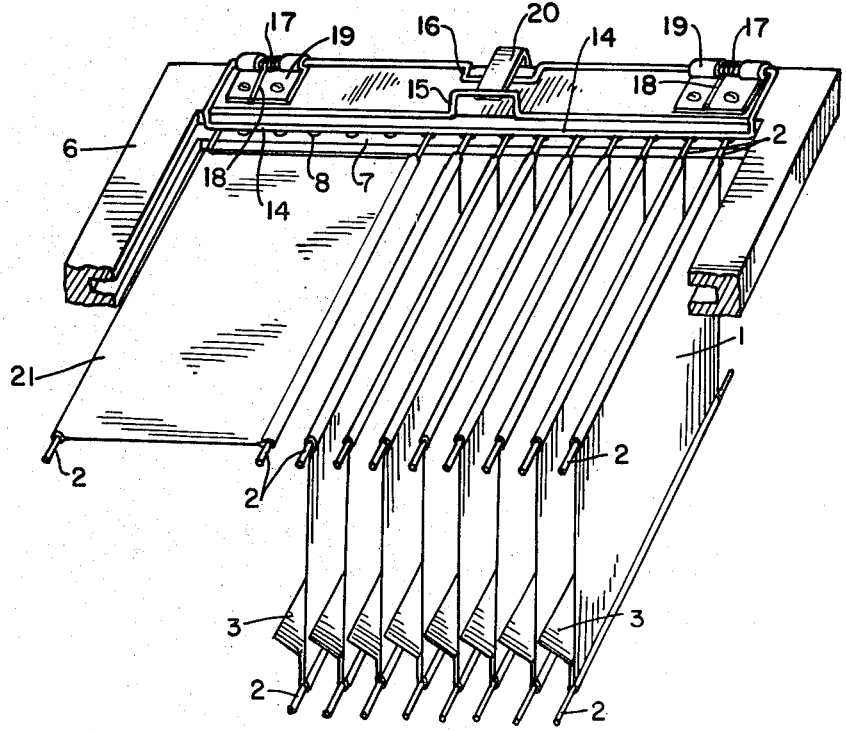
FIG. 14 is a view showing the document holders and an auxiliary document table as they are mounted on the actuating frame.

FIG. 3 shows an oblong example of an original sheet or document 4 to be copied with the inventive device, insertable in the holder 1, and having an index portion 5 which will serve as a constituent part of the list to be prepared with the device. It will be understood that the holders 1 of the device are somewhat larger in their overall dimensions than the documents to be accommodated, for ex. as shown at 4, in their areas above the tongues 3 behind which the documents are inserted for copying the index portions 5 thereof.

As shown in FIGS. 4 to 8, an actuating frame 6 is fitted with lengthwise wire supporters 7 provided with a suitable number of recessed portions 8 for receiving the wires 2 of a number of document holders 1 as will be explained later in more detail. In recessed grooves 8' on the opposite sides of a base plate 9 are also inserted wire supporters 7'.

Instead of providing supporters 7, 7' both on the frame 6 and the base plate 9, the recessed portions 8, 8' for receiving the wires 2 may also be formed directly in the frame 6 and the base plate 9.

The frame 6 and the base plate 9 are connected in the assembled device by means of links 10 having stop members 11 (see FIGS. 9 and 10). On one end of the base plate 9 are provided hooks 12 having catches 13 to be engaged with a recessed groove (not shown) in the lower portion of the actuating frame 6.

It will be seen in FIGS. 11 to 15 (but omitted from FIGS. 4, 5, 9) that on opposite sides of the actuating frame 6 are mounted document clamps 14, each integrally made of wire and including a holding portion 15, a stopping portion 16, springs 17 having pressing members 18, and holding members 19. To a position where the portion 16 is located, a plate spring 20 is secured on the frame 6.

The recessed portions 8 of the frame 6 are positioned above the upwardly directed recessed portions 8' of the base plate 9 so as to face the latter. The document holders 1 are mounted between the upper and the lower recessed portions 8, 8' with a suitable sideways distance apart. On one of the terminal portions of the frame 6 is inserted, in the opposite side thereof, an auxiliary document table 21 (shown in FIG. 14), and also provided with lengthwise wires 2. A space is provided in frame 6 for attaching the table 21 therein.

Figure 15:
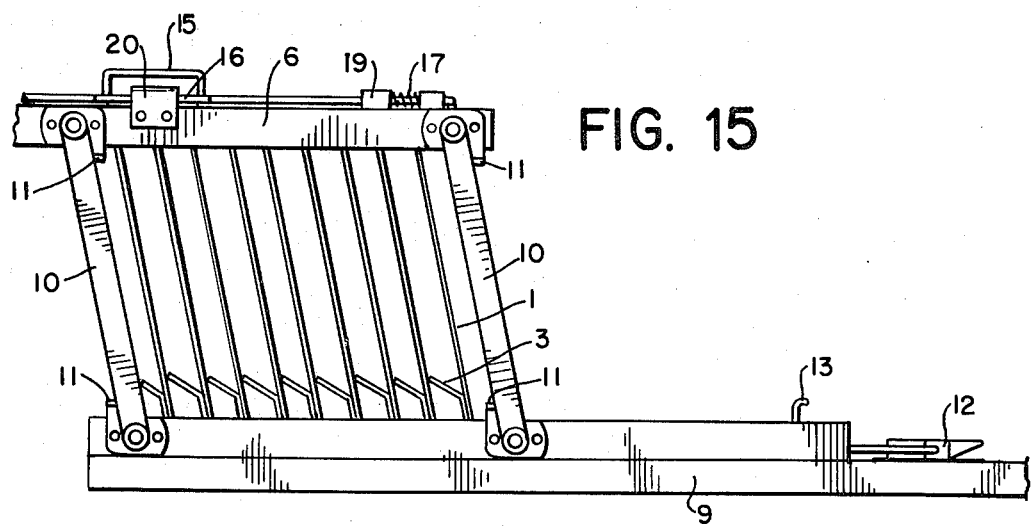
FIG. 15 is a front view, similar to FIG. 9, but showing the complete device of the present invention as the actuating frame is pushed up and the document holders are in upright position.

To use the present device, the holding portions 15 of the document clamps 14 are lifted to allow the stopping portions 16 to engage with the plate springs 20, and the document clamps 14 are then opened. When the actuating frame 6 is pushed forward while being lifted upward from the base plate 9, the frame 6 is held at a predetermined angle by the stop members 11 attached to the links 10, and the respective document holders 1 which have been mounted between the base plate 9 and the actuating frame 6 are brought to an upright position at a definite angle, with the holder tongues 3 opened, as shown in FIG. 15.

In this position, when the desired original sheets or documents 4 are respectively inserted in the holders 1 as if by dropping therein, they are retained by the tongues 3 formed in the lower portion of each holder 1. The frame 6 is then drawn backward while depressing the same. The original documents 4 are now arranged in an overlapping manner, each exposing the index portion 5 with a suitable space apart from one another. In case the frame 6 is secured by the hooks 12 attached to the base plate 9, the documents 4 can be held in proper alignment. If the clamps 14 are closed by the holding portions 15, with an auxiliary document placed on the document table 21 or in a suitable position, the sheets 4 and the auxiliary document on table 21 are compiled into a list in an integrated manner, and securely held together at the same time.

The inventive device is then turned upside down and set on the exposing surface (usually a glass plate or window) of a conventional copying machine. Thereafter copying can be carried out in the usual manner.

The advantages of the present invention will be described with respect to the copying operation. As compared with the conventional method in which lists are made by manual transcription, the operation with the inventive device can be carried out readily even by unskilled people. In addition, by mounting the wires 2 of the document holders 1 in the recessed portions 8, 8' at desired positions on the wire supporters 7, 7', the index areas 5 of the documents 4 can be enlarged, reduced or copied without change in size, according to the prevailing requirements.

Should a document holder 1 become damaged, replacement can be made very easily. An entirely different list can be obtained from the same original sheets or documents 4 by properly regrouping the same, as will be understood by those skilled in the art. With these various advantages, the present invention ensures improvements in efficiency of clerical work and a substantial reduction of labor costs.

What I claim is:

1. A device for making a list by copying portions, such as index areas, of oblong documents in an integrated form, comprising in combination replaceable oblong holders somewhat larger than the documents to be accommodated, said holders having tongues at one of the longer edges thereof for receiving the documents of which the index areas are to be copied, said tongues having substantially the same length as said holders, lengthwise wires respectively attached to portions of said holders along their longer edges, said wires being substantially parallel with each other and with said tongues, an actuating frame having two parallel sides and a plurality of opposed recessed portions in each of said sides, for receiving therein some of said wires to mount said holders in any desirable spaced-apart relation, a base plate disposed in facing relationship with said actuating frame, said base plate having two parallel sides and a plurality of opposed recessed portions in each of said sides, for receiving therein others of said wires, parallel-motion link means pivotally connected to said frame and said base plate, and stop means for said link means, associated with said base plate, so that said frame may be raised and folded down, in continuous parallel planar relationship with said base plate, for purposes of manually inserting, copying and removing the documents, wherein the respective recessed portions of the frame and of the base plate have substantially the same spacing to allow said holders to be selectively inserted by way of their respective wires in each consecutive, in each second, in each third recessed portion, and so on, as the case may be, so as selectively to expose a wide range of widths of said index areas of the documents when said frame is folded down onto said base plate for copying said index areas.

2. The device as defined in claim 1, further comprising at least one hook means fixed to said base plate for engaging a portion of said frame and holding the same in a substantially coplanar, aligned position with respect to said base plate when said frame is folded down.

3. The device as defined in claim 1, further comprising means associated with said holders for opening and closing said tongues.

4. The device as defined in claim 1, further comprising lengthwise wire supporters fixed to said sides of the frame, and other wire supporters fixed to said sides of the base plate, for forming therein the respective recessed portions.

5. The device as defined in claim 1, further comprising an auxiliary document table adapted to be attached to said frame in a space formed in the latter, for receiving another document to be copied, in a manner similar to that of said holders.

6. The device as defined in claim 1, further comprising at least one document clamp adapted for cooperation with said frame, and means for securing said clamp to said frame.

7. The device as defined in claim 6, wherein said clamp is made from wire, with a holding portion for manual actuation before insertion and removal of the documents in the associated holders, and a stopping portion for operative engagement with said securing means.

8. The device as defined in claim 6, wherein said securing means include holding members attached to said frame, and spring means interposed between said clamp and said members.

9. The device as defined in claim 8, wherein said securing means further include pressing members cooperating with said spring means, and further comprising plate springs secured to said frame for operatively engaging portions of said clamp.

10. The device as defined in claim 1, wherein said link means is constituted by two pairs of links pivotally attachable to said frame and said base plate.

* * * * *